United States Patent [19]
Ford

[11] Patent Number: 5,146,863
[45] Date of Patent: Sep. 15, 1992

[54] AIR CUSHION DISPLACEMENT HULL WATER VEHICLE

[75] Inventor: Allen G. Ford, Rockville, Md.

[73] Assignee: The United States of America as represented by the Secretary of the Navy, Washington, D.C.

[21] Appl. No.: 779,795

[22] Filed: Oct. 21, 1991

[51] Int. Cl.$^5$ .................................... B63B 1/34
[52] U.S. Cl. .......................... 114/67 A; 114/67 R
[58] Field of Search ............... 114/67 R, 67 A, 288, 114/289, 271, 56

[56] References Cited

U.S. PATENT DOCUMENTS

| | | | |
|---|---|---|---|
| 986,766 | 3/1911 | Schroeder | 114/67 A |
| 1,408,178 | 2/1922 | Downing | 114/67 A |
| 1,621,625 | 3/1927 | Casey | 114/67 A |
| 1,868,054 | 7/1932 | Easthope . | |
| 2,708,894 | 5/1955 | Hook | 114/66.5 |
| 2,753,135 | 7/1956 | Gouge | 244/106 |
| 3,016,864 | 1/1962 | Woodfield | 114/66.5 |
| 3,027,860 | 4/1962 | Priest | 114/67 |
| 3,146,752 | 9/1964 | Ford | 114/67 |
| 3,595,191 | 7/1971 | Grundy | 114/67 A |
| 3,788,263 | 1/1974 | McDermott | 114/67 A |

*Primary Examiner*—Edwin L. Swinehart
*Attorney, Agent, or Firm*—Charles D. Miller; Gary Borda

[57] ABSTRACT

An air cushion displacement hull water vehicle has a novel construction so as to defrictionize water flowing under the hull as the vehicle is propelled through the water. The hull includes a forward bow portion, an opposing aft end portion, a pair of sidewalls spaced from each other and extending between the forward bow portion and the aft end portion, and a bottom wall extending between the forward bow portion and the aft end portion and between the pair of sidewalls. The bottom wall of the hull is recessed to define an air cushion region. An air supply device positioned within the interior of the hull communicates with the air cushion region and is operable to supply pressurized air to the air cushion region to defrictionize water flow under the air cushion region.

5 Claims, 1 Drawing Sheet

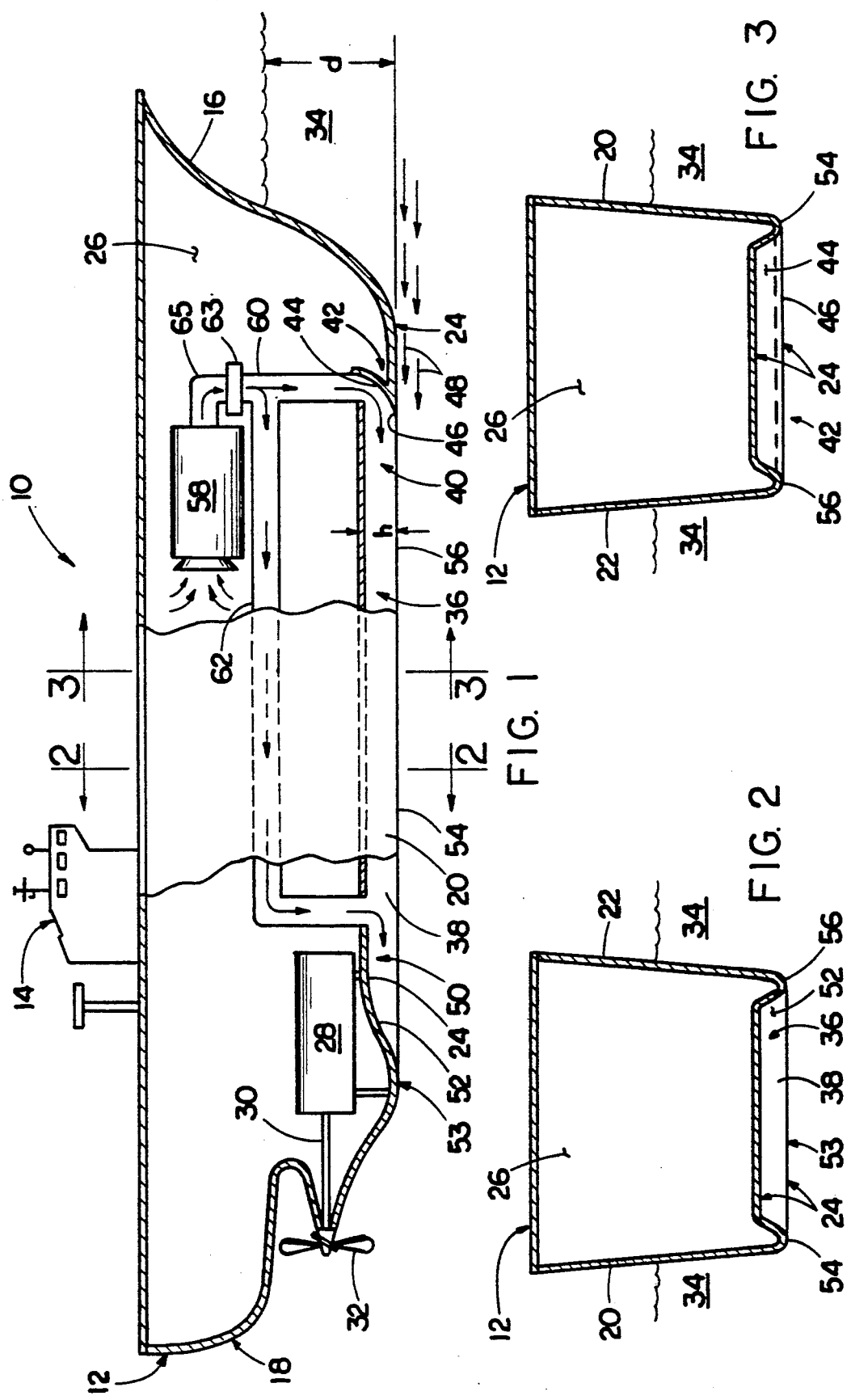

AIR CUSHION DISPLACEMENT HULL WATER VEHICLE

RIGHTS OF THE GOVERNMENT

The invention described herein may be manufactured and used by or for the Government of the United States of America for governmental purposes without the payment of any royalties thereon or therefor.

BACKGROUND OF THE INVENTION

1. Field of the Invention

The present invention relates generally to a displacement hull water vehicle and, more particularly, to a displacement hull water vehicle having an air cushion region formed in the bottom portion of the hull in order to defrictionize the water flow under the hull as the vehicle is propelled through the water.

2. Description of the Prior Art

Displacement hull water vehicles are well known and presently in common use on a world-wide basis. Examples of displacement hull vehicles are aircraft carriers and large petroleum transport ships, tankers. Displacement hull water vehicles have relatively sharp bows and flat bottoms, the sharp bow divides the approaching water to the right and to the left as the vehicle moves forward across or through the water. Displacement hull vehicles are characterized as being relatively slow compared to surface effect ships (SES) which is mainly due to the amount of friction (drag) on the hull caused by the water moving along the hull as the vehicle is propelled through the water.

Consequently, a need exists for a displacement hull water vehicle having a hull construction designed to mitigate the effects of some of the friction drag as the vehicle is propelled through water to thereby permit the vehicle to attain a higher nautical speed at a given propelling power level than is presently possible or conversely to permit the vehicle to travel at the same given speed but at lower power level in thus requiring less fuel consumption.

SUMMARY OF THE INVENTION

The present invention relates to an air cushion displacement hull water vehicle designed to satisfy the aforementioned needs. The air cushion displacement hull water vehicle of the present invention has an air cushion region formed in the hull bottom wall operable to defrictionize the water flow under the bottom wall as the vehicle is propelled through the water. With this arrangement, the drag of the vehicle has been reduced so as to achieve a higher nautical speed for a given propelling power than would otherwise normally be achieved; or conversely, permits the vehicle to achieve a given nautical speed at a lower propelling power than would normally be required.

In accordance with the present invention, there is provided an air cushion displacement hull water vehicle which includes a hull having a forward bow portion, an opposing aft end portion, a pair of sidewalls spaced from each other and extending between the forward bow portion and the aft end portion and a bottom wall extending between the forward bow portion and the aft end portion and also between the sidewalls. The bottom wall has a recessed portion formed therein which extends into the interior of the hull to define an air cushion region. An air supply device positioned within the interior of the hull communicates with the air cushion region and is operable to supply pressurized air to the air cushion region. The pressurized air within the air cushion region is operable to reduce friction drag between the hull bottom wall at the area of the air cushion region and water passing under the air cushion region as the hull is propelled through the water.

These and other features and advantages of the present invention will become apparent to those skilled in the art upon a reading of the following detailed description when taken in conjunction with the drawings wherein there is shown and described illustrative embodiments of the invention.

BRIEF DESCRIPTION OF THE DRAWINGS

In the course of the following detailed description, reference will be made to the attached drawings in which:

FIG. 1 is a side elevational view, partially in section, of the air cushion displacement hull water vehicle of the present invention, illustrating an air cushion region positioned in the bottom wall of the vehicle hull operable to reduce friction drag between the hull bottom wall at the area of the air cushion region and water passing under the air cushion region as the vehicle is propelled through the water;

FIG. 2 is a sectional view of the air cushion displacement hull water vehicle as seen along line 2—2 of FIG. 1, illustrating the air cushion region extending into the interior of the hull; and FIG. 3 is a sectional view of the air cushion displacement hull water vehicle as seen along line 3—3 of FIG. 1, illustrating the configuration of the forward end portion of the air cushion region.

DETAILED DESCRIPTION OF THE INVENTION

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIG. 1, there is illustrated a side elevational view, partially in section, of the air cushion displacement hull water vehicle of the present invention being generally designated by the numeral 10. As will be described herein, the air cushion displacement hull water vehicle 10 has a construction designed to largely eliminate friction drag between the bottom of the vehicle 10 and the water passing under the bottom of the vehicle 10 as it is propelled through the water. Reducing the friction drag between the bottom of the vehicle 10 and the water through which the vehicle 10 is propelled permits the vehicle 10 to achieve a lower drag and power for a given speed; or conversely, permits a somewhat higher speed at a constant power.

As seen in FIG. 1, the air cushion displacement hull vehicle 10 includes a displacement hull 12 having a superstructure 14 positioned thereon. The specific superstructure 14 illustrated in FIG. 1 is only an example of the type which may be utilized in conjunction with the hull 12, and it should be understood that any type of superstructure 14 suitable for use with the hull 12 may be employed.

The hull 12 includes a forward bow portion 16 and an opposing aft end portion 18. A pair of opposing sidewalls 20, 22 (only sidewall 20 shown in FIG. 1) extend between the forward bow portion 16 and the opposing aft end portion 18. A bottom wall 24 extends between the forward bow portion 16 and the aft end portion 18 of the hull 12 and also extends between the opposing sidewalls 20, 22 of the hull 12. The forward bow portion 16, aft end portion 18, opposing sidewalls 20, 22 and bottom wall 24 are configured to define a hull interior portion 26. A conventional power plant 28 is positioned within the interior 26 of the hull 12 and is operable to rotate a shaft 30 which in turn rotates a propeller 32 in order to propel the air cushion displacement water vehicle 10 through the water 34.

The forward bow portion 16, aft end portion 18, opposing sidewalls 20, 22 and bottom wall 24 are configured to give the hull 12 the appearance of a conventional displacement hull. However, as will be described herein, the bottom wall 24 has a novel configuration which substantially defrictionizes or eliminates the friction drag of the water 34 passing under the bottom wall 24.

Now referring to FIGS. 1 and 3, the bottom wall 24 includes a recessed portion 36 formed therein which extends upwardly into the interior 26 of the hull 12. The recessed portion 36 defines an air cushion region 38 which extends along the longitudinal centerline of the hull 12 from a location aft of the forward bow portion 16 to a location forward of the aft end portion 18 and extends laterally between the hull sidewalls 20, 22. The air cushion region 38 has a forward end portion 40 shaped in the form of a cusp 42 having a configuration to cause any water 34 passing by the cusp 42, as the vehicle 10 is propelled through the water 34, to detach smoothly from the cusp 42. This smooth detachment reduces any possible wave generation in the air cushion region 38, particularly near the cusp 42. The cusp 42 includes a curved surface 44 which forms the forward, laterally extending wall of the air cushion region 38. The curved surface 44 meets the hull bottom wall 24 at the region 38 forward end portion 40 to form a relatively sharp face 46 which extends over the entire width of the air cushion region 38. As the water 34 flows by the sharp face 46 of the cusp 42, as indicated by the directional arrows 48, the water detaches smoothly from the cusp 42. The cusp 42 is positioned a sufficient distance aft of the forward bow portion 16 to permit water pressure fluctuations, caused by the forward bow portion 16 interacting with the water 34 as the vehicle 10 is propelled through the water 34, to subside before the water 34 detaches from the cusp 42. As will be explained later herein, pressurized air introduced into the air cushion region 38 prevents the water 34 detached from the cusp 42 from flooding the air cushion region 38. In addition, the air cushion region 38 is designed to extend a distance "h" upwardly into the interior 26 of the hull 12 sufficient to prevent any waves generated as the water 34 detaches from the cusp and entering the air cushion region 38 from contacting the portion of the bottom wall 24 within the air cushion region 38.

Now referring to FIGS. 1 and 2, the air cushion region 38 further includes a rearward end portion 50 located forward of the hull rearward end portion 18. The portion of the bottom wall 24 of the hull 12 at the rearward end portion 50 of the air cushion region 38 has a generally smooth contour, as indicated by the numeral 52, as it descends to a level 53 consistent with retaining the air cushion region 38. Finally, the air cushion region 38 includes a pair of opposing port and starboard edges in the form of hull shapes 54, 56 which extend between the forward and rearward end portions 40, 50 of the air cushion region 38 and function to retain pressurized air introduced into the air cushion region 38.

As seen in FIG. 1, pressurized air is introduced into the air cushion region 38 of the hull 12 via an air supply device 58 positioned within the interior 26 of the hull 12. The air supply device 58 may be any device capable of delivering air at an elevated pressure, such as a fan or an air compressor. The output of the air supply device 58 is connected to a pair (or more) of first and second air lines 60, 62 through a common header 65. The first air line 60 communicates with the forward end portion 40 of the air cushion region 38 and the second air line 62 communicates with the rearward end portion 50 of the air cushion region 38. As the air supply device 58 is operated, air at an elevated pressure passes through the common header 65 and through the first and second air lines 60, 62 and into the forward and rearward end portions 40, 50 of the air cushion region 38. The pressurized air fills the air cushion region 38 to prevent the water 34, passing under the bottom wall 24 of the hull 12, from flooding the air cushion region 38. The air therefore defrictionizes the water flow at the air cushion region 38. A check valve 63 is positioned in the common header 65 ahead of the air lines 60, 62 and is operable to allow pressurized air to pass from the air supply device 58 to the air cushion region 38 while simultaneously operable to block the flow of water from the air cushion region 38 to the air supply device 58 in the event that the vehicle 10 is docked or the air supply device 58 is not operating. In any event, the compressor or fan is above the water level and water in the air line will only rise as high as the water level if the compressor is not operating.

In order to prevent the water 34 from flooding the air cushion region 38 as the vehicle 10 is propelled through the water 34, the pressure of the air introduced into the region 38 via the first and second air lines 60, 62 should be equal to the pressure of the water 34 measured at a depth "d" representative of the depth of the hull bottom wall 24 (at the bow) outside the air cushion region 38. The pressure of the water 34 measured at the depth "d" may be predicted. However, it is not necessary to control the air fan or compressor pressure in any sophisticated way because an air fan or compressor will automatically control the pressure (to that of depth "d") provided that its zero-flow-rate pressure is suitably above the depth "d" pressure.

The use of a pair (or more) of air lines, such as air lines 60, 62 illustrated in FIG. 1 to deliver pressurized air to both the forward and rearward end portions 40, 50 of the air cushion region 38, prevents any inadvertent isolation of these regions from a source of adequate air supply.

It is thought that the present invention and many of its attendant advantages will be understood from the foregoing description and it will be apparent that various changes may be made in the form, construction and arrangement of the parts of the invention described herein without departing from the spirit and scope of the invention or sacrificing all of its material advantages, the forms hereinbefore described being merely preferred or exemplary embodiments thereof.

I claim:

1. An air cushion displacement hull water vehicle, comprising:
    a hull having a forward bow portion, an opposing aft end portion, a pair of sidewalls spaced from each other and extending between said forward bow portion and said aft end portion and a bottom wall extending between said forward bow portion and said aft end portion and between said sidewalls and having a recessed portion formed therein which extends into an interior portion of said hull to define an air cushion region; said bow portion being a sharp bow which divides approaching water to the right and left and
    air supply means positioned within said interior portion of said hull and operatively connected with said air cushion region for supplying pressurized air to said hull and water passing under said hull as said hull is propelled through said water,
    said air cushion region has a forward end portion and a rearward end portion said region extending from near the bow to near the stern of the vehicle; and
    said air supply means includes a source of air at elevated pressure and a common header for passing pressurized air from the source of air, said common header including a check valve therein to prevent water from entering the source of air through the common header;
    a first air supply line,
    a second air supply line,
    said first air supply line having a first end and a second end and being connected at a first end with the said common header, said second end being located in the said rearward end portion of said air cushion region said first air line passes air from said air source to said rearward end portion of said air cushion region;
    said second air supply line having a first end an a second end, and being connected at the first end with the said common header, said second end being located in the said forward end portion of said air cushion region, said second air supply line passes air from said air source to said forward end portion of said air cushion region;
    said forward end portion of said air cushion region includes a component shaped in the form of a cusp having a sharp face at the lowest point on the vehicle said face being pointed in the aft direction to cause smooth separation of the water passing thereunder as said hull is propelled through the water.

2. The air cushion displacement hull water vehicle as recited in claim 1, wherein said air supply means is a fan.

3. The air cushion displacement hull water vehicle as recited in claim 1, wherein said air supply means is an air compressor.

4. The air cushion displacement hull water vehicle as recited in claim 1, wherein said cusp is positioned a distance aft of said forward bow portion sufficient to permit water pressure fluctuation caused by the forward bow portion interacting with said water as said hull is propelled therethrough to subside before said water detaches from said cusp.

5. The air cushion displacement hull water vehicle as recited in claim 1, wherein said air supply means delivers air to said air cushion region at a pressure substantially equal to the pressure of the water adjacent to said hull bottom wall as said hull is propelled through said water.

* * * * *